April 5, 1949.  G. E. MERRITT  2,466,322
INTERFEROMETRIC GAUGE
Filed Dec. 16, 1944  5 Sheets-Sheet 1
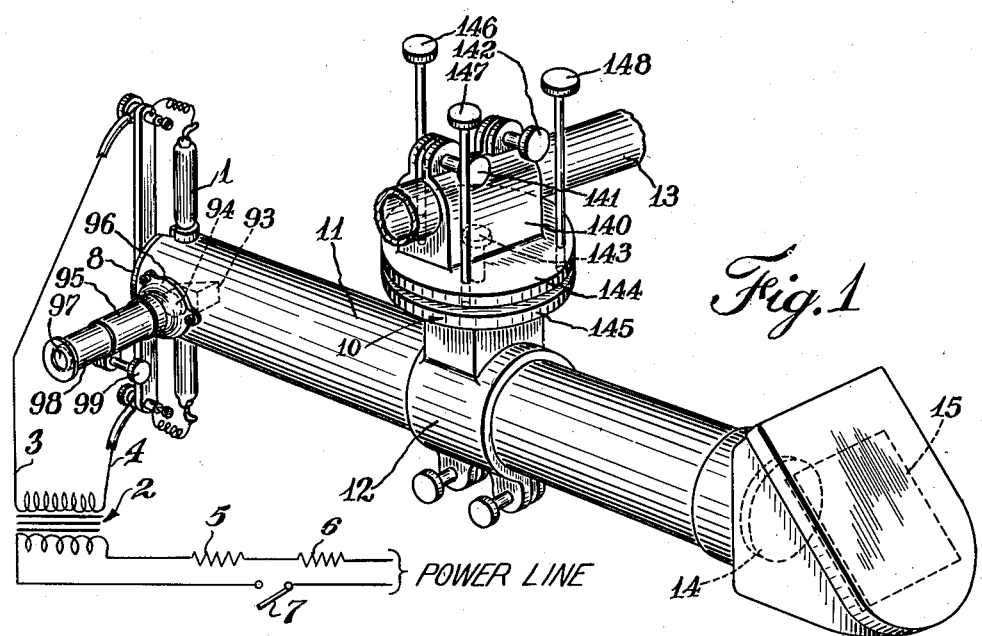
Fig. 1
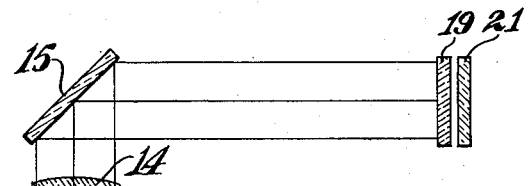
Fig. 2
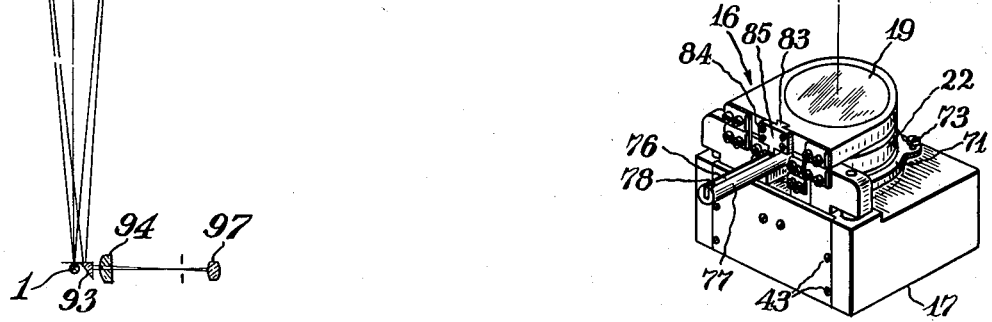
WITNESS:
Burr W. Jones
INVENTOR
BY George E. Merritt
ATTORNEY

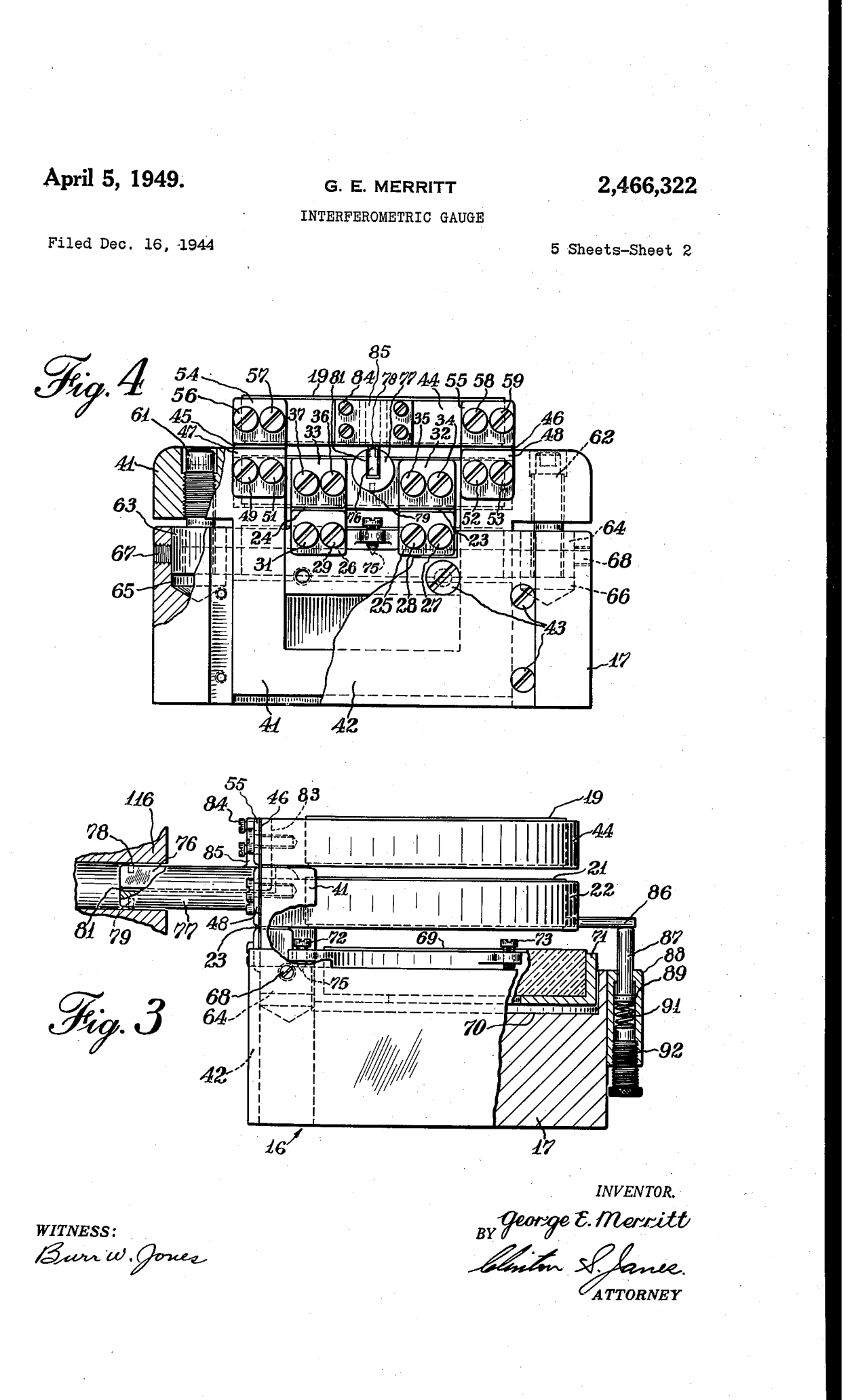

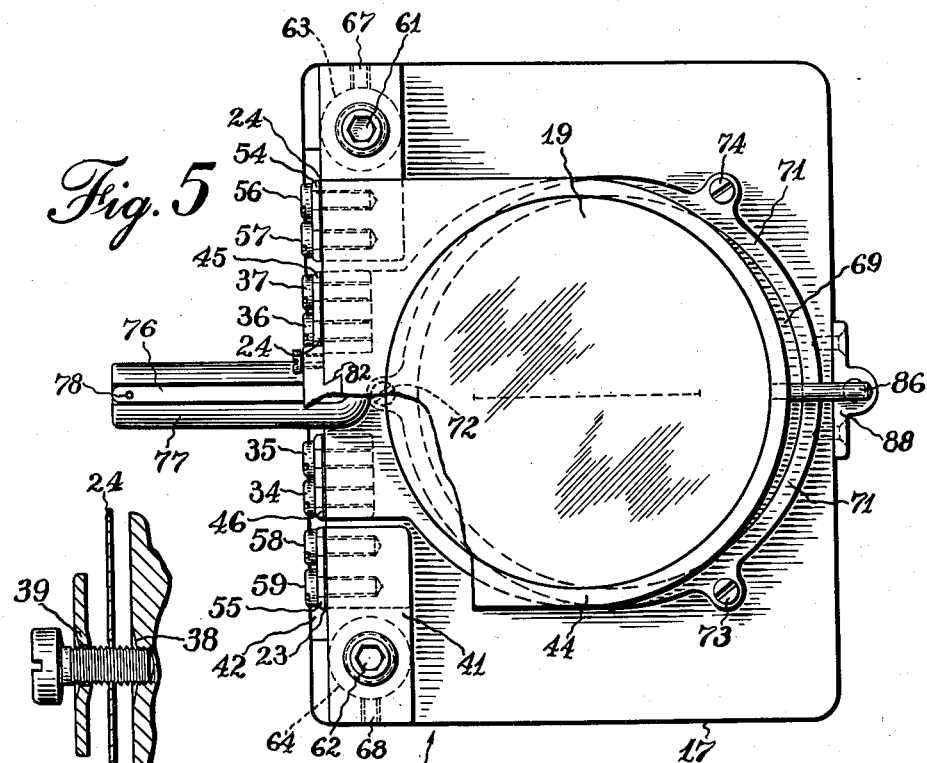
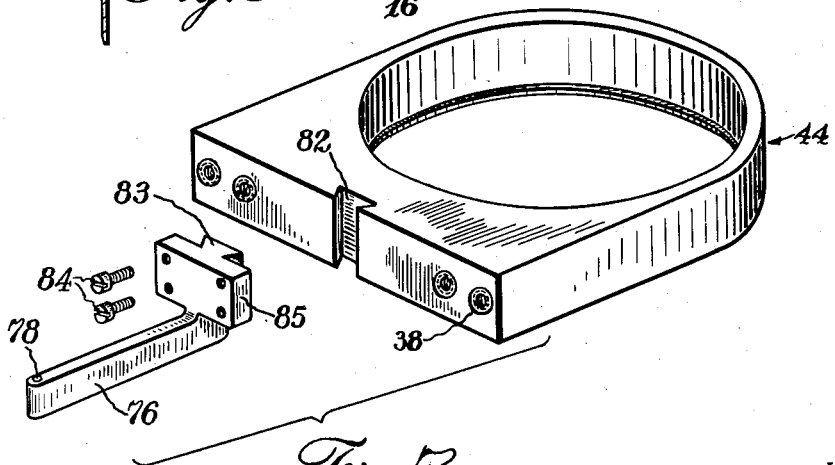

April 5, 1949.    G. E. MERRITT    2,466,322
INTERFEROMETRIC GAUGE
Filed Dec. 16, 1944    5 Sheets-Sheet 4
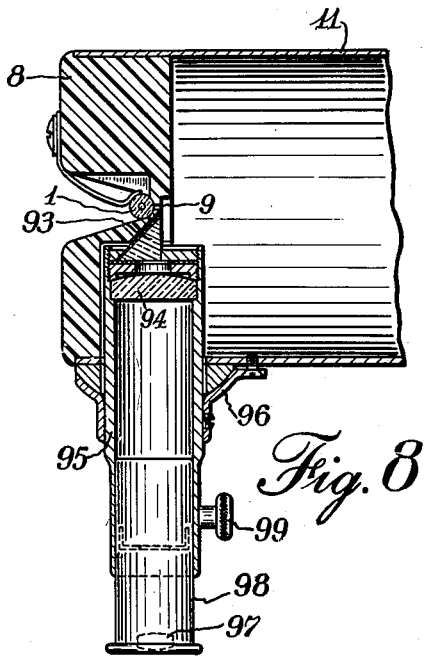
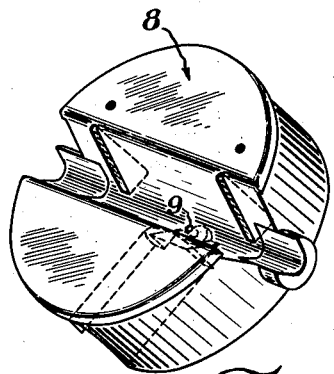
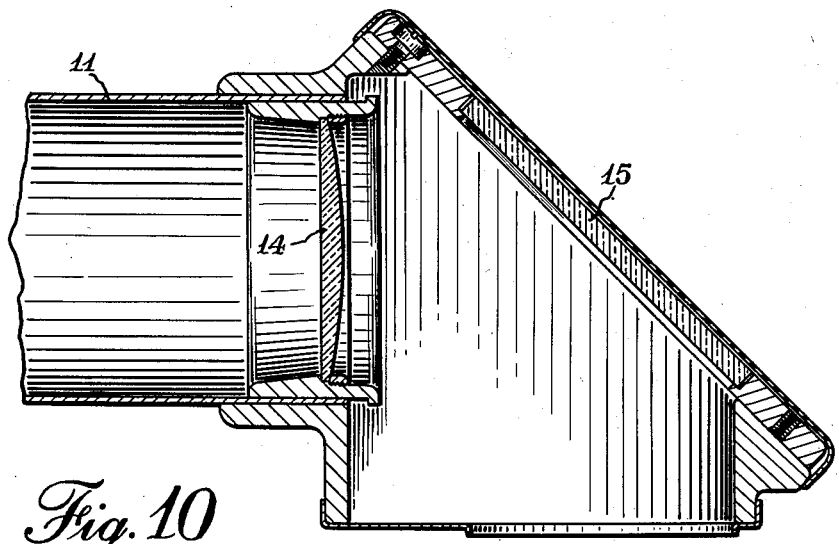
WITNESS:
Burr W. Jones
INVENTOR
George E. Merritt
BY
Clinton S. Janes
ATTORNEY

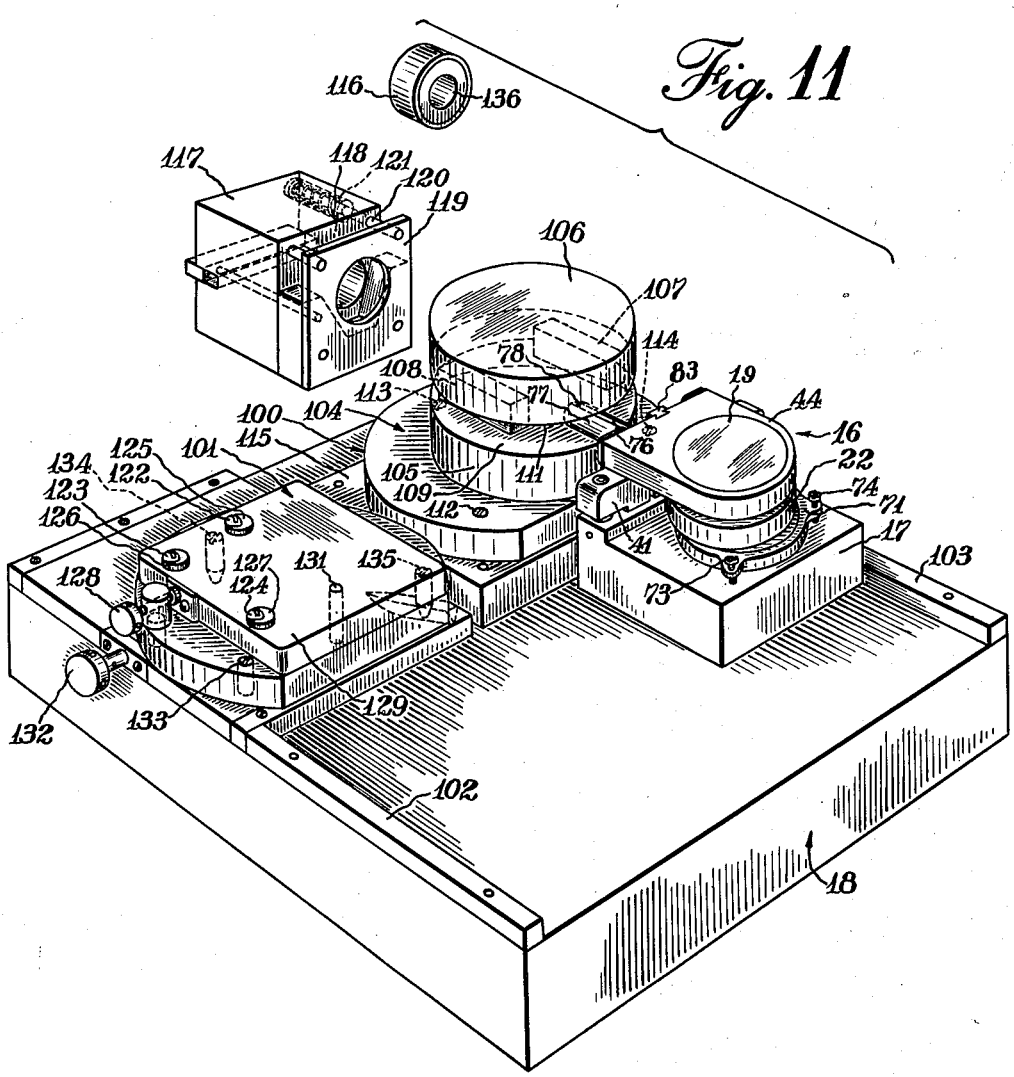

Patented Apr. 5, 1949

2,466,322

UNITED STATES PATENT OFFICE 2,466,322

INTERFEROMETRIC GAUGE

George E. Merritt, Elmira Heights, N. Y., assignor to Bendix Aviation Corporation, South Bend, Ind., a corporation of Delaware Application December 16, 1944, Serial No. 568,517

13 Claims. (Cl. 33—149)

The present invention relates to an interferometric gauge, and more particularly to an instrument and a procedure for utilizing said instrument for accurately comparing the internal dimensions of hollow articles. The method of manufacturing articles to precise dimensions utilizing the gauge herein disclosed is claimed in the co-pending application Serial 611,456 filed August 20, 1945.

In the manufacture of interengaging parts requiring very accurate fits such for instance as in the manufacture of fuel pumps for internal combustion engines, it has so far been impossible to secure general interchangeability of parts due largely to the lack of sufficiently stable and sensitive gauging means, and of a sufficiently accurate control of the machine operations by virtue thereof. It has been found necessary, therefore, in the assembly of such parts, to maintain supplies of parts graded by small steps of variation in the critical dimension, and assemble the parts selectively to secure the desired fit. Thus in the manufacture of plungers and bushings for fuel pumps where the tolerance in fit is for example plus or minus 5 millionths of an inch, it has heretofore been found necessary to maintain eight classifications of parts as to diametral measurement, and assemble the parts by proper selection from such classes. The method is obviously disadvantageous as compared to complete interchangeability of parts.

It is an object of the present invention to provide a novel interferometric internal gauge which is sufficiently accurate and sensitive to indicate variations in dimensions in the order of millionths of an inch.

Another object is the provision of such a device which is particularly adapted for the measurement of the internal diameters of cylinders, and which provides highly accurate means for obtaining perpendicularity of the measurement of the distance between two parallel optically flat surfaces, especially in the direction at right angles to the axis of the cylinder.

Another object is the provision of such a device which provides highly accurate means for adjusting the axis of the cylinder relative to the measuring device in a line parallel with the surfaces of the optical flats.

Another object is the provision of such a device which provides highly accurate means for setting the gauging points in the cylinder to be measured exactly on the diameter of the cylinder and of maintaining the perpendicularity of the line intersecting said points with the axis of the cylinder and with the planes of the optical flats.

It is another object to provide such a device embodying a pair of caliper arms, each of which is rigidly fixed to one of a pair of optical flats which are hingedly connected to a common base.

It is a further object to provide such a device having means for producing and observing light patterns formed by interference between the light reflected from the adjacent surfaces of the flats.

It is another object to provide such a device in which the means for observing the light pattern comprises an optical system which is mounted independently of the gauge mechanism including the optical flats, and which is universally adjustable and extensible.

It is another object to provide such a device in which said arms are readily and accurately adjustable with respect to the flats, both laterally and vertically.

It is another object to provide such a device in which the caliper arms are provided with jewels for contacting the work, and means are provided for accurately controlling the pressure of the jewels against the work.

It is another object to provide such a device in which the hinge connection is free from lost motion or abaxial deflection, and substantially free from static friction.

It is another object to provide such a device having rigid unitary holders for the flats.

It is another object to provide such a device in which the hinge connection is provided by flexible plates which are rigidly anchored to the holders for the optical flats.

It is another object to provide a novel method of manufacturing parts with very small dimensional tolerances so as to secure interchangeability of parts which require close fits.

It is another object to provide such a method which utilizes a gauge of the above type to accomplish the desired dimensional accuracy.

Further objects and advantages will be apparent from the following description taken in connection with the accompanying drawings in which:

Fig. 1 is a perspective view of the optical system and gauge constituting a preferred form of the invention shown in perspective, the electrical system for the light source being shown diagrammatically;

Fig. 2 is a diagrammatic showing of the optical system of the gauge;

Fig. 3 is a side elevation on an enlarged scale, partly broken away, of the gauge mechanism per se;

Fig. 4 is a front view of the structure illustrated in Fig. 3;

Fig. 5 is a top view of the gauge mechanism;

Fig. 6 is a detail partly in section showing the method of anchoring the hinge members for the optical flats;

Fig. 7 is a detail in perspective of the holder for the upper optical flat with its gauge arm detached therefrom;

Fig. 8 is a detail partly in section showing the light source and the viewing lens system;

Fig. 9 is a detail in perspective of the holder for the light source;

Fig. 10 is a sectional detail on an enlarged scale of the lens and mirror system for directing the light onto the gauge and for receiving the reflected light and directing it to the observing lens system; and Fig. 11 is a detail in perspective of the base or stage for the gauge, the work and the standard gauge fixture, the latter being shown partly disassembled for the purpose of clarity.

In Fig. 1 of the drawing there is illustrated a light source 1 which is here shown in the form of a gaseous tube arranged to be activated by a source of electricity at high potential such as a transformer 2 the secondary of which is connected by leads 3 and 4 to the tube 1, and the primary of which is energized from a suitable power line through controlling resistors 5, 6 and a manual switch 7.

The light source 1 is mounted in a holder 8 best shown in Fig. 9, which holder is provided with a small opening 9 in line with the central portion of the tube 1. The holder 8 is mounted in the end of a cylinder 11 which is adjustably supported in a bracket 12 carried by a cross bar 13 forming part of a suitable supporting frame not illustrated. It will be understood that the entire instrument is preferably housed in an air-conditioned and temperature controlled chamber such as illustrated for instance in the copending application of Merritt, Serial Number 549,709, filed August 16, 1944 now Patent No. 2,450,839, issued Oct. 5, 1948, but since such chamber forms no part of the present invention, illustration thereof in this application is deemed unnecessary.

The opposite end of the cylinder 11 has mounted therein a converging lens 14 best shown in Fig. 10, and a mirror 15 arranged substantially at an angle of 45° to the axis of the cylinder, whereby when the cylinder is positioned horizontally the light which traverses the cylinder axially from the opening 9 in the light source holder is reflected downwardly onto the interferometric gauge indicated generally by numeral 16. The lens 14 is a convergent lens located substantially at its focal length from the light source 1 whereby the light rays emitted by the source are brought into parallelism.

The gauge 16 comprises a frame or base 17 having a flat bottom surface slidably mounted on a plane table or gauge platform 18, (Fig. 11).

A pair of optical flats 19 and 21 of suitable material such as fused quartz are mounted on the base 17 with freedom for slight pivotable movement with respect thereto. As best shown in Figs. 3 and 4, the lower flat 21 is mounted in a holder 22 in any suitable manner, and the holder is hinged to the base by means of flexible metal plates 23 and 24 whereby static friction of the joint is substantially eliminated. These plates are rigidly clamped to the base by means of blocks 25 and 26 and cap screws 27, 28, 29 and 31, and are similarly connected to the holder 22 by means of clamp blocks 32 and 33, and cap screws 34, 35, 36 and 37.

In order that the hinged mounting may be made secure and without possibility of slippage, the surface of the elements adjacent to the cap screws is countersunk as shown at 38 in Fig. 6 and the clamping blocks are offset as shown at 39 in order to slightly deform the hinge adjacent the anchoring screws.

The upper optical flat 19 is similarly hinged to the base 17, and for this purpose a rigid yoke member 41 is tightly clamped against the side of said base as by means of a block 42 and cap screws 43. The holder 44 for the upper flat 19 is connected to the ends of the yoke by means of hinge members 45 and 46 which are fixed to the yoke by clamping blocks 47, 48 and cap screws 49, 51, 52, 53, and to the holder 44 by clamping blocks 54, 55 and cap screws 56, 57, 58, and 59.

Micrometric means for adjusting the yoke 41 vertically are provided in the form of bolts 61, 62 threaded through the ends of the yoke and into threaded bushings 63, 64. The pitches of the two threaded portions of bolts 61, 62 are preferably slightly different so as to provide a very fine adjustment of the yoke by differential action. The bushings 63, 64 are adjustably fitted in vertical openings 65, 66 in the base 17 thereby providing a coarse preliminary adjustment of the yoke. The bushings are maintained in adjusted position by suitable means such as set screws 67 and 68.

A leveling optical flat 69 is adjustably mounted on the base 17 below the gauge flat 21, and substantially parallel therewith. As shown in Fig. 3 this is accomplished by means of a carrier 71 supported on the base by means of three adjustable cap screws 72, 73 and 74, located substantially equidistantly around the periphery of the carrier. The cap screw 72 is preferably pointed and arranged to seat in a conical opening 75 in the base 17 in order to locate the carrier with respect to the base. The carrier 71 is preferably arranged to enter loosely within a suitable conforming recess 70 in the top surface of the base 17, as shown in Fig. 3.

The upper and lower surfaces of the lower gauge flat 21 are formed at a small dihedral angle such as twenty minutes, so that the beam of light from the light source 1 is reflected from said surfaces at slightly different angles. This allows observation of the interference pattern between the light reflected from the upper surface of flat 21 and lower surface of flat 19 separate from the pattern formed by the light reflected from the lower surface of flat 21 and the upper surface of the leveling flat 69. The shifting of the optical system from one pattern to the other is readily accomplished by a slight adjustment of the support 10 for the cylinder 11.

Gauge arms 76 and 77 are rigidly attached to the carriers 44 and 22 respectively, and adjacent their free ends are provided with jewel points 78 and 79 arranged in vertical alignment. The arm 77 is preferably formed integrally with the carrier 22, and is provided with a longitudinal slot 81 in which the arm 76 is freely movable. Gauge arm 76 is preferably attached to the carrier 44 in the manner indicated in Fig. 7, where the carrier is illustrated as having an undercut vertical guideway 82, and the arm 76 is provided with a dovetail extension 83 having a sliding fit in the guideway 82 whereby the vertical distance between the jewel points 78, 79 may be varied to permit measurement of a suitable range of diameters. Cap screws 84 are arranged to traverse the base 85 of the arm 76 and bear against the surface of the carrier 44 in order to immobilize the arm with respect to the carrier. Slight lateral adjustment of the arm 76 is obtained by selective adjustment of the cap screws 84 whereby the jewel gauge point 78 may be located directly above the companion gauge point 79.

Micrometric means are illustrated for adjusting the lower gauge flat 21 with respect to the base 17 about its hinge connection 23, 24. As shown in Fig. 3, this means is in the form of an arm 86 projecting from the carrier 22 and resting on a plunger 87 which is vertically slidable in a hollow guide member 88 fixed to or formed as a part of the base 17. The position of the plunger 87 within the guide 89 is determined by a spring 91 therein, the tension of which is adjustable by means of a threaded plug 92. This adjusting means may be omitted if desired, as shown in Fig. 11, in order to eliminate the slight amount of static friction caused thereby, and its function of balancing the weight of the lower flat 21 and its carrier, and maintaining a light pressure of the gauge point 79 on the interior of the part to be gauged, may be accomplished by merely preloading or giving a suitable set to the spring hinges 23 and 24.

The viewing system for the interferometric gauge comprises a prism 93 mounted in the holder 8 with its edge closely adjacent the light opening 9, and a convergent lens 94 mounted in the inner end of a tube 95 suitably fixed to the cylinder 11 as by means of a clamp bracket 96. An eye piece 97 is mounted in the outer end of a barrel 98 which is slidable in the tube 95, the eye piece being adjustable by any suitable focusing means such as indicated at 99.

The optical system is so arranged that the light reflected from the adjacent surfaces of the optical flats is converged and directed onto the prism 93, and the interference pattern caused by the light reflected from said surfaces is projected by the lens 94 in proper position to be observed by means of the eye piece 97.

The gauge here disclosed is intended more particularly to facilitate accurate comparisons of the internal dimensions of hollow parts. For this purpose, a fixture is provided for holding the part to be gauged, and the arms of the gauge are so adjusted that a predetermined interference pattern is formed by the gauge when the gauge points 78, 79 are exactly at the standard dimensional distance from each other. When the gauge is then introduced into the part to be gauged, any divergence in accuracy of the part will cause a change in the interference pattern which change can be used as an index to measure such inaccuracy.

For the purpose of conveniently calibrating and using the gauge, the plane table 18 is provided with space for carrying a standard gauging fixture 100, a mounting fixture 101 for holding parts to be gauged, and straight guide means 102, 103 adjacent said two fixtures arranged to be engaged by the flat sides of the gauge base 17 to provide for rectilinear movement thereof on the table 18 so as to move the gauge arms 76, and 77 into and out of the parts to be gauged. The standard gauging fixture 100 comprises a platform 104 on which rests an optical flat 105 of quartz or other suitable material. A second optical flat 106 is superimposed over the flat 105, vertically spaced therefrom by standard gauge blocks 107, 108 of the Johannson type whereby the upper surface 109 of the lower flat is spaced from the lower surface 111 of the upper flat by a distance which is precisely equal to the desired dimension of the part to be gauged.

The perpendicularity of the straight line joining the contact points 78 and 70 with respect to the fused quartz plates in a direction longitudinal with respect to the lever arms of the caliper may be obtained by setting the jewels over the line joining the two forward leveling screws 112 and 114 (Fig. 11) of the standard bearing fixture and raising and lowering the third leveling point 113. If considerable motion of this point (½ turn or more in either direction) causes no change in the fringes and further motion in either direction causes a motion indicating an increase in distance between the contact points of the jewels then the perpendicularity in this direction is sufficiently accurate. A similar method may be used to secure perpendicularity in a lateral direction.

The first step in the calibration of the gauge is the adjustment of the lower standard gauging flat 105 so as to level up the surface 109 thereof with respect to the surface of the plane table 18. This is accomplished by adjustment of three leveling screws 112, 113 and 114 which raise and lower the platform 104 with respect to its base 115. The operation consists in sliding the interferometric gauge on its base 17 along the guide 103 until the gauge arms 76, 77 enter the space between the flats 105, 106 with the jewel point 79 of the lower arm 77 in engagement with the upper surface 109 of the lower flat 105. The leveling flat 69 is then adjusted by means of the cap screws 72, 73 and 74 until an interference pattern is formed by the light reflected from the lower surface of the flat 21 and the upper surface of the leveling flat 69. Preferably the adjustment is continued until the interference pattern consists of a suitable low number of fringes, the spacing of the fringes being recorded by counting the number of fringes between a pair of reference points a certain distance apart on a line ruled on one of the optical flat surfaces perpendicular to the plane including the axes of the hinges of the flat holders. The interferometric gauge is then moved farther along the guide 103, the fringed pattern again observed, and the leveling screws 112, 113, 114 adjusted until longitudinal movement of the interferometric gauge produces no change in the interference pattern. The surface 109 is thus proved to be parallel with the surface of the plane table 18 in the direction of the guide 103. The interferometric gauge is then slid laterally on the plane table 18, and the process repeated until lateral movement of the gauge does not affect the interference pattern. The surface 109 of the flat 105 is then leveled up with respect to the surface of the plane table 18.

The observing system of the gauge is then shifted slightly in order to bring into the field of view the interference pattern between the adjacent surfaces of the two gauge flats 19, 21. This is preferably done by means of the adjusting means illustrated in Fig. 1. As there shown, the bracket 12 is connected to the supporting cross bar 13 by a clamp member 140 fixed to the cross bar by clamping screws 141, 142. The bracket 12 is suspended from the clamp 140 by suitable means such as a bolt 143 loosely seated in the clamp member and so threaded into the bracket as to permit a small amount of universal movement of the bracket. The adjacent surfaces of the clamp and bracket are formed with flanges 144 and 145 respectively, which are maintained in slightly spaced relation by the bolt 143, and adjusting screws 146, 147 and 148 are threaded through the clamp flange 144 so as to bear on the bracket flange 145 and provide convenient means for shifting or tilting the viewing system.

After the observing system has been thus shifted, the upper flat is adjusted by means of the differentially threaded adjusting screws 61, 62 for the yoke 41 until a suitable pattern of fringes is obtained, and the number of fringes between standard reference lines on one of the flats counted and recorded. It is then known that when the diamond points 78, 79 are separated by the standard distance determined by the height of the gauge blocks 107, 108, the recorded number of fringes are produced in the measured portion of the surfaces of the optical flats.

When a part, such as a gauge ring 116 is to be measured, it is placed in a suitable holder 117 and held against the surface 118 thereof by suitable means such as a plate 119 having pull rods 120 actuated by springs 121 for pressing the plate against the holder 117. The holder is seated on the upper surface of the mounting fixture 101, being positioned thereon by adjusting means comprising screws 122, 123, 124 and eccentric buttons 125, 126, 127 respectively. Rotation of the buttons causes the buttons to move the holder 117 laterally to properly locate the gauge ring 116 with respect to the gauge arms 76, 77 of the interferometric gauge after which the positions of the buttons are fixed by tightening the screws 122, 123, and 124. The mounting fixture 101 is provided with means 128 for adjusting the upper plate 129 of said fixture about a pivot 131. It is also provided with means 132 for moving the entire fixture laterally on the plane table 18 and also with screws 133, 134, 135 by which the upper plate 129 may be leveled with respect to the surface of the plane table.

When the ring 116 is thus mounted in the holder 117, and the latter seated on the fixture 101, the interferometric gauge is withdrawn from the standard gauging fixture 104 and slid over on the plane table 18 against the guide 102 and advanced toward the fixture 101 until the gauge arms 76, 77 enter the opening 136 of the ring 116 to be gauged. The fixture 101 is then adjusted until the gauge point 79 is in its lowest position as determined by observing changes in the fringe pattern formed between the lower surface of the flat 21 and the upper surface of the leveling flat 69. The low point of the inside cylindrical surface of the ring is indicated by a maximum or minimum in the number of leveling fringes formed between the flats 21 and 69, further motion sideways of the ring by traversing means 132 in either direction causing the same effect on the fringe pattern. The diametrical position in the ring of the two contact points is indicated by a maximum or minimum in the number of measuring fringes formed between the flats 21 and 19, a further motion by traversing means 132 in either direction causing the same change in this fringe pattern.

At this time, the holder is raised or lowered, and leveled until the line forming the lowest part of the cylindrical surface of the ring is brought into the same plane (with respect to the measuring device) as surface 109 of flat 105. The adjustment of said line from which the diameters are to be measured, so that it will have the same relation to the measuring device as the lower surface of the standard (surface 109 of flat 105) is obtained by manipulating the work holder by the adjusting means 133, 134, 135 and 125, 126, 127 and 128 until the same fringe pattern is obtained for two longitudinal positions of the measuring device along the guide 102, the low point as indicated by a static condition of the leveling fringes formed by flats 21 and 69, being chosen at both positions.

When the jewel points have thus been properly positioned, the observing system is again shifted to the pattern between the gauging flats 19, 21, and the number of fringes between the reference points thereon counted. The difference between the number of fringes so counted and the number of fringes observed when the gauge was calibrated by means of the standard gauging fixture gives an accurate measure of the divergence of the diameter of opening 136 from the desired standard dimension.

The gauge measurement corresponding to one light fringe will of course vary with the wave length of the light used. When a substantially monochromatic light source of known wave length is used, this relationship may be readily calculated. When, for instance, the light source is a helium lamp which emits light having a wave length of .5875316 micron and the length of the gauge arms from hinge to contact point is 1.5 inches, this relation may be calculated as follows:

Let

L = the length of the gauge arm from the hinge to the jewel.
A = the vertical movement of the jewel.
$\theta$ = the angle at the hinge axis subtended by the distance A.
L' = the distance between the measuring lines on the optical flat.
A' = the chord of the angle $\theta$ at radius L'.

Then tan $\theta = A/L$

Also tan $\theta = A'/L'$
$L' = A'/\tan \theta$

Assume

L = 1.5 inches

And

A = 10 millionths of an inch

Then tan $\theta = .00001/1.5$

When helium light of a wave length of .5875316 micron is used, one fringe indicates a difference in distance apart of the two plates of 11.56 millionths of an inch, therefore, the angle $\theta$ will be indicated by 1 fringe when the length L' is obtained by the formula.

$$L' = .00001156/\tan\theta$$
$$= .00001156 \times 1.5/.00001$$
$$= 1.734 \text{ inches}$$

According to the present invention the interferometric gauge above described is used in a process of manufacturing inter-fitting parts requiring precise fits, to such close tolerances that the parts may be completely or substantially completely interchangeable. This has heretofore been extremely difficult if not impossible since sufficiently accurate gauges for determining the dimensions of the parts in the final stages of manufacture were not available. It is true that air gauges and electro-limit gauges are available commercially which are sufficiently sensitive to indicate differences in the order of a few millionths of an inch but these gauges are purely comparison instruments and must be calibrated against standards in order to interpret their readings. Moreover such instruments are not adapted to compare the measurement of the inner diameter of a cylindrical surface with the perpendicular distance between two parallel planes. Such standard interplanar distances with the requisite accuracy are commercially available in the form of Johannson blocks but sufficiently accurate standards are practically unobtainable directly in any other form. The control of the manufacture of parts can be no more accurate than the means for calibrating the comparator gauges. The interferometric gauge here disclosed permits the calibration of such comparator gauges with extreme accuracy hitherto unobtainable by commercial gauging apparatus and methods.

The process of micrometrically accurate manufacture of articles having internal cylindrical surfaces according to the present invention may be illustrated for example by the manufacture of cylindrical bushings of fuel injection pumps for internal combustion engines. Such bushings are now being manufactured to a tolerance of plus or minus five millionths of an inch.

The bushings are first roughed out in any suitable manner, then the interior cylindrical surface is ground to approximate size, the size being tested by a stepped series of plug gauges until the next to the largest plug, which may for instance be three ten-thousandths of an inch under size, enters the bushing but the last one will not enter. The following steps are then taken, first: calibration of a ring gauge to an accuracy of about plus or minus 3 or 4 millionths of an inch by the above described method of the use of the interferometric gauge—second: the use of such calibrated ring gauge to calibrate a comparator gauge such as an air gauge or an electro-limit gauge, and third: the use of the comparator gauge to measure the interior diameter of the bushing being manufactured during the final operation of grinding to size. The interferometric gauge may also be used for inspection of the bushing directly, as a final check on the whole process.

The process above outlined enables the accurate control of the final manufacturing operations with uniformity and convenience since the ring gauges may be used for a considerable length of time with periodic checking on the interferometric gauge and the latter may therefore be used to control a large number of inspection operations. Since the accuracy of the interferometric gauge is dependent only upon the accuracy of the Johannson blocks and such blocks may be obtained which are highly accurate and uniform, it is clear that this method is capable of producing parts with the required dimensional accuracy, when suitable means are used for removing the amount of material indicated to be necessary by the control gauges.

Although certain structure has been shown and described in detail and certain steps have been disclosed for the utilization of such structure, it will be understood that changes may be made in the precise design and arrangement of the parts and certain steps may be omitted or added without departing from the spirit of the invention as defined in the claims appended hereto.

What is claimed is:

1. In an interferometric gauge, a base, a pair of optical flats superimposed one on the other in spaced relation with their plane faces in approximate parallelism and hinged to the base on an axis substantially parallel to said plane faces, means for directing a beam parallel light rays on said flats substantially normal thereto, the flat nearest the light-directing means being light-transmitting, means for observing the interference pattern in the light reflected from the flats caused by a divergency from exact parallelism thereof, a pair of caliper arms having contact points adjacent the ends thereof, means for rigidly attaching one of said arms to each flat, said attaching means including means for adjusting one of said arms with respect to the other so as to locate the straight line joining said points in a plane normal to the hinge axis and substantially perpendicular to the planes of said flats.

2. An interferometric gauge as set forth in claim 1 in which one of said arms is in the form of a bar having a longitudinal slot, and the other arm is in the form of a beam lying loosely in said slot.

3. An interferometric gauge as set forth in claim 1 in which the attaching means for one of said arms is arranged to provide for bodily adjustment of the arm in the direction of the line joining the contact points, to permit measurement of various sizes of work while maintaining the optical flats within the desired proximity to parallelism.

4. An interferometric gauge as set forth in claim 1 including further a hinged holder for one of said flats to which the corresponding caliper arm is attached, said holder and arm having an undercut tongue and groove slidable connection, and a plurality of screw means on both sides of said connection for tightening the connection, said means being individually adjustable in order to set the position of the contact point carried by the arm.

5. In an interferometric internal gauge, a base, an optical flat, a holder therefore, means for hingedly mounting the holder on the base, a second optical flat and a holder therefore, at least one of said optical flats being light-transmitting, and means for hingedly mounting the second holder on the base with its pivotal axis parallel and coplanar with the axis of the first holder, said second mounting means comprising a yoke member having a hinged connection at its ends to the second optical flat holder and means for rigidly mounting the yoke members on the base.

6. An interferometric gauge as set forth in claim 5 including further a pair of caliper arms rigidly fixed to said holders and extending substantially normal to the plane of said hinge axes.

7. An interferometric internal gauge as set forth in claim 5 including further, micrometric means for adjusting the first holder about its axis, and in which the means for mounting the yoke member in the base includes means providing both a coarse and a fine adjustment of said yoke with respect to the base.

8. An interferometric internal gauge as set forth in claim 5 in which said yoke is arranged to straddle the hinged mounting means for the first holder.

9. An interferometric internal gauge as set forth in claim 5 in which the mounting means for the yoke includes means for clamping the central portion of the yoke to the base and threaded means for independently adjusting the spacing of the ends of the yoke from the base.

10. An interferometric internal gauge as set forth in claim 5 in which said hinged mounting means comprise flexible plates and means for anchoring said plates including studs traversing said plates and threaded into the parts to be connected, and means for slightly deforming the portions of the plates surrounding the studs to prevent slippage.

11. An interferometric internal gauge as set forth in claim 5 in which said hinged mounting means comprise flexible plates and means for anchoring said plates including studs traversing the plates and threaded into openings in the parts to be connected, said openings being countersunk and said studs having heads conforming to the countersinks and arranged to press the plates into the countersinks.

12. In an interferometric gauge a horizontal flat table, gauge means including a base having a flat bottom surface slidably mounted on the table, a pair of gauging optical flats superimposed one on the other in spaced substantially parallel relation and hinged to the base on parallel horizontal axes, at least the upper one of said optical flats being light-transmitting, a caliper arm fixed to each flat, said arms having contact points located in a line perpendicular to the table.

13. In an interferometric gauge a horizontal plane table, a rectilinear guide thereon, gauge means including a base having a flat bottom surface slidably mounted on the table and a plane lateral surface for engagement with the guide, a pair of gauging optical flats superimposed one on the other in spaced substantially parallel relation and hinged to the base on horizontal axes lying in the same vertical plane, both said optical flats being light-transmitting, a caliper arm fixed to each flat, said arms having contact points located in a line perpendicular to the table and a leveling optical flat adjustably mounted on the base beneath and substantially parallel to the gauging flats.

GEORGE E. MERRITT.

REFERENCES CITED

The following references are of record in the file of this patent:

UNITED STATES PATENTS

| Number | Name | Date |
|---|---|---|
| 1,347,133 | Twyman | July 20, 1920 |
| 1,386,663 | Twyman | Aug. 9, 1921 |
| 1,554,392 | Weaver | Sept. 22, 1925 |
| 1,901,632 | Chamberlain | Mar. 14, 1933 |
| 2,010,301 | Helfer | Aug. 6, 1935 |
| 2,024,020 | Aldeborgh | Dec. 10, 1935 |
| 2,100,056 | Klamp et al. | Nov. 23, 1937 |

FOREIGN PATENTS

| Number | Country | Date |
|---|---|---|
| 340,492 | Germany | Sept. 14, 1921 |

OTHER REFERENCES

Publication — Bureau of Standards Scientific, copy in 88—14I (Div. 7); Paper #365, 1920, also 33–143A (Div. 62); pp. 669-678 and Plate facing 674, "A New Interferential Dilatometer," by Priest.